(12) United States Patent
Leonhardt et al.

(10) Patent No.: US 11,451,902 B1
(45) Date of Patent: Sep. 20, 2022

(54) SPEAKER WITH VENTED RESONATOR

(71) Applicant: Apple Inc., Cupertino, CA (US)

(72) Inventors: Oliver Leonhardt, San Francisco, CA (US); Logan A. Rotolo, San Francisco, CA (US); Claudio Notarangelo, San Francisco, CA (US); Joshua Kim, Atlanta, GA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/315,230

(22) Filed: May 7, 2021

(51) Int. Cl.
*H04R 1/28* (2006.01)
*H04R 1/02* (2006.01)
*G06F 1/16* (2006.01)

(52) U.S. Cl.
CPC ......... *H04R 1/2826* (2013.01); *G06F 1/1688* (2013.01); *H04R 1/025* (2013.01); *H04R 1/2888* (2013.01)

(58) Field of Classification Search
CPC .... H04R 1/2826; H04R 1/025; H04R 1/2888; G06F 1/1688
USPC ........................................................ 381/345
See application file for complete search history.

(56) References Cited

U.S. PATENT DOCUMENTS

| | | |
|---|---|---|
| 2,880,817 A | 4/1959 | Burns et al. |
| 4,410,064 A | 10/1983 | Taddeo |
| 4,777,650 A | 10/1988 | Frederiksen |
| 5,012,890 A | 5/1991 | Nagle et al. |
| 5,022,486 A | 6/1991 | Miura et al. |
| 5,225,639 A | 7/1993 | Kobayashi et al. |
| 5,261,006 A | 11/1993 | Nieuwendijk et al. |
| 5,452,268 A | 9/1995 | Bernstein |
| 5,479,520 A | 12/1995 | Nieuwendijk et al. |
| 5,514,841 A | 5/1996 | Rochon |
| 5,696,357 A | 12/1997 | Starobin |
| 5,710,395 A | 1/1998 | Wilke |
| 5,737,435 A | 4/1998 | De Poortere et al. |
| 6,018,585 A | 1/2000 | Akino |
| 6,130,951 A | 10/2000 | Nakamura et al. |
| 6,188,773 B1 | 2/2001 | Murata et al. |
| 6,278,789 B1 | 8/2001 | Potter |
| 6,356,643 B2 | 3/2002 | Yamagishi et al. |
| 6,668,064 B1 | 12/2003 | Lin |
| 6,751,330 B2 | 6/2004 | Kowaki et al. |
| 7,415,122 B2 | 8/2008 | Soutar |
| 7,433,483 B2 | 10/2008 | Fincham |

(Continued)

FOREIGN PATENT DOCUMENTS

| | | |
|---|---|---|
| CN | 1140970 | 1/1997 |
| CN | 1706231 | 12/2005 |

(Continued)

*Primary Examiner* — Sean H Nguyen
(74) *Attorney, Agent, or Firm* — BakerHostetler

(57) ABSTRACT

Aspects of the subject technology relate to electronic devices having speakers with vented resonators. A vented resonator may have a resonator chamber and a channel that fluidly couples a front volume of the speaker with the resonator chamber. A vent such as a barometric vent may be disposed in a wall of the resonator chamber that separates the resonator chamber from the back volume of the speaker. The barometric vent may thus allow airflow from the front volume to the back volume via the resonator chamber, and prevent fluid flow from the front volume to the back volume via the resonator chamber.

20 Claims, 5 Drawing Sheets

(56) References Cited

U.S. PATENT DOCUMENTS

| | | |
|---|---|---|
| 7,740,104 B1 | 6/2010 | Parkins |
| 7,840,023 B2 | 11/2010 | Eaton |
| 7,869,617 B2 | 1/2011 | Jang et al. |
| 8,213,660 B2 | 7/2012 | Phillips |
| 8,213,666 B2 | 7/2012 | Groesch |
| 8,290,179 B2 | 10/2012 | Gregg et al. |
| 8,325,958 B2 | 12/2012 | Rass |
| 8,494,577 B2 | 7/2013 | Shiogama |
| 9,099,094 B2 | 8/2015 | Burnett |
| 9,107,003 B2 | 8/2015 | Dix et al. |
| 9,317,068 B2 | 4/2016 | Sanders |
| 9,348,371 B2 | 5/2016 | Hoobler |
| 9,408,009 B1 | 8/2016 | Witte et al. |
| 9,469,469 B2 | 10/2016 | Rayner |
| 9,498,032 B2 | 11/2016 | Wu |
| 9,538,272 B2 | 1/2017 | Auclair |
| 9,560,430 B2 | 1/2017 | Iuchi |
| 9,560,435 B2 | 1/2017 | Richardson |
| 9,571,910 B2 | 2/2017 | Lu |
| 9,591,110 B2 | 3/2017 | Hill |
| 9,888,307 B2 | 2/2018 | Vitt et al. |
| 10,299,032 B2 * | 5/2019 | Grazian ............... H04R 1/2811 |
| 10,397,693 B1 * | 8/2019 | Tao ...................... H04R 1/025 |
| 2003/0059073 A1 | 3/2003 | Bren |
| 2005/0084128 A1 | 4/2005 | Niederdraenk |
| 2008/0095390 A1 | 4/2008 | Gebert |
| 2009/0097669 A1 | 4/2009 | Kamiya |
| 2009/0097679 A1 | 4/2009 | Maeda |
| 2009/0158849 A1 | 6/2009 | Gregg |
| 2010/0040250 A1 | 2/2010 | Gebert |
| 2012/0202559 A1 * | 8/2012 | Shiogama ............. H04R 1/021 |
| | | 381/386 |
| 2013/0148834 A1 | 6/2013 | Seo |
| 2013/0271902 A1 | 10/2013 | Lai et al. |
| 2014/0270273 A1 | 9/2014 | Muza |
| 2014/0339012 A1 | 11/2014 | Richardson et al. |
| 2015/0163572 A1 | 6/2015 | Weiss et al. |
| 2015/0172815 A1 | 6/2015 | Park |
| 2016/0080871 A1 | 3/2016 | Zinn |
| 2016/0122177 A1 | 5/2016 | Zinn |
| 2016/0192065 A1 * | 6/2016 | Oosato ................ H04R 1/2819 |
| | | 381/378 |
| 2017/0164084 A1 | 6/2017 | Vitt |
| 2017/0183218 A1 | 6/2017 | Zinn |
| 2017/0332167 A1 | 11/2017 | Liu |
| 2018/0081406 A1 | 3/2018 | Kita |
| 2020/0045395 A1 * | 2/2020 | Wu ....................... H04R 1/023 |

FOREIGN PATENT DOCUMENTS

| | | |
|---|---|---|
| CN | 102934463 | 2/2013 |
| CN | 103200501 | 7/2013 |
| DE | 19601217 | 7/1997 |
| EP | 0360517 | 3/1990 |
| EP | 0429121 | 5/1991 |
| EP | 0744880 | 11/1996 |
| EP | 1685741 | 4/2013 |
| GB | 2408405 | 5/2005 |
| GB | 2463529 | 3/2010 |
| JP | H 08-331685 | 12/1996 |
| JP | 2606447 B | 2/1997 |
| JP | H 09-149487 | 6/1997 |
| JP | H 10-66184 | 3/1998 |
| JP | H 11-259011 | 9/1999 |
| JP | 2000-115898 | 4/2000 |
| JP | 2001-145186 | 5/2001 |
| KR | 2010-0129629 | 12/2010 |
| WO | WO 91/19406 | 12/1991 |
| WO | WO 99/45742 | 9/1999 |

* cited by examiner

US 11,451,902 B1

SPEAKER WITH VENTED RESONATOR

TECHNICAL FIELD

The present description relates generally to audio transducers for electronic devices, including, for example, speakers with vented resonators.

BACKGROUND

Electronic devices such as computers, media players, cellular telephones, wearable devices, and headphones are often provided with speakers for generating sound output from the device. However, particularly as devices are implemented in ever smaller form factors, and as user demand for high quality audio increases, it can be challenging to provide speakers that generate high quality sound, particularly in compact devices such as portable electronic devices.

BRIEF DESCRIPTION OF THE DRAWINGS

Certain features of the subject technology are set forth in the appended claims.

However, for purpose of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Portable electronic devices such as a mobile phones, portable music players, tablet computers, laptop computers, wearable devices such as smart watches, headphones, earbuds, other wearable devices, and the like often include one or more audio transducers such as a microphone for receiving sound input, or a speaker for generating sound.

However, challenges can arise when constraints for spatial integration with other device components, airflow management, and/or other constraints compete with audio quality constraints when attempting to implement an audio transducer module (e.g., a speaker or speaker module) in a device. These challenges can be particularly difficult when attempting to implement an audio transducer module into a compact device such as a portable or a wearable device.

In accordance with various aspects of the subject disclosure, a speaker having a vented resonator is provided. The speaker may provide a flattened response at high frequencies, by providing multiple resonators (e.g., Helmholtz resonators, or HHRs) acoustically coupled to the front volume of the speaker. In one or more implementations, at least one of the resonators may include a barometric vent that allows airflow and/or equalization of pressure between the front volume and the back volume of the speaker through the resonator. In one or more implementations, providing a barometric vent within a resonator of a speaker (e.g., rather than locating the barometric vent in or directly coupled to the front volume) can help to reduce the size of a front volume of the speaker. Reducing the size of the front volume by providing the vent in the resonator in this way can be advantageous for producing a desired high frequency response of the speaker. This is because the reduced front volume size can help to reduce an overall geometrical path length (e.g., from a rear wall of the front volume) to a speaker port exit. Providing a barometric vent in an acoustic resonator of a speaker can thus help save front volume space and/or shorten the output path length of the speaker in one or more implementations.

Figure 1:
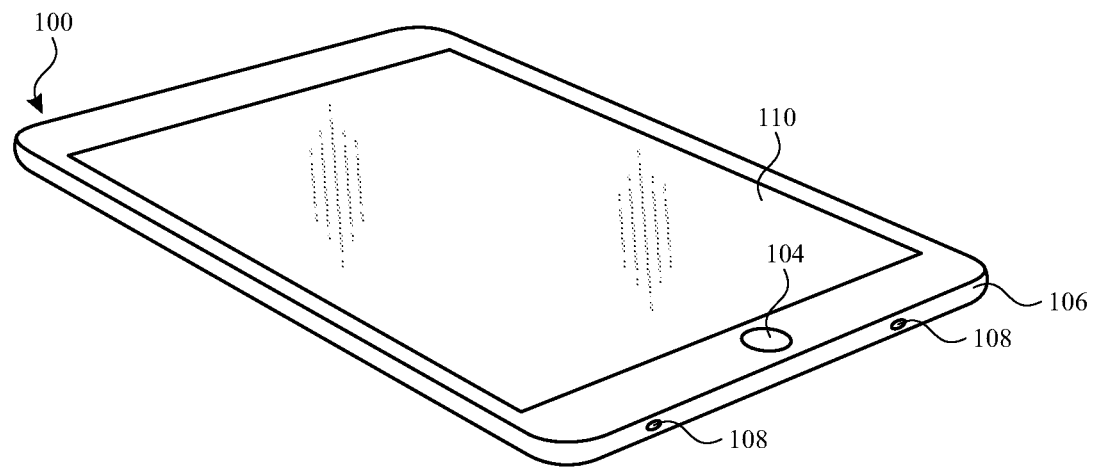
FIG. 1 illustrates a perspective view of an example electronic device having an audio transducer module with a vented resonator in accordance with various aspects of the subject technology.

An illustrative electronic device including a speaker is shown in FIG. 1. In the example of FIG. 1, device 100 (e.g., an electronic device) has been implemented using a housing that is sufficiently small to be portable and carried by a user (e.g., device 100 of FIG. 1 may be a handheld electronic device such as a tablet computer or a cellular telephone or smart phone). As shown in FIG. 1, device 100 includes a display such as display 110 mounted on the front of housing 106. Device 100 includes one or more input/output devices such as a touch screen incorporated into display 110, a button or switch such as button 104 and/or other input output components disposed on or behind display 110 or on or behind other portions of housing 106. Display 110 and/or housing 106 include one or more openings to accommodate button 104, a speaker, a light source, or a camera.

In the example of FIG. 1, housing 106 includes two openings 108 on a bottom sidewall of housing 106. One or more of openings 108 forms a port for an audio component. For example, one of openings 108 may form a speaker port for a speaker disposed within housing 106 and another one of openings 108 may form a microphone port for a microphone disposed within housing 106. Openings 108 may be open ports or may be completely or partially covered with a permeable membrane or a mesh structure that allows air and sound to pass through the openings. Although two openings 108 are shown in FIG. 1, this is merely illustrative. One opening 108, two openings 108, or more than two openings 108 may be provided on the bottom sidewall (as shown) on another sidewall (e.g., a top, left, or right sidewall), on a rear surface of housing 106 and/or a front surface of housing 106 or display 110. In some implementations, one or more groups of openings 108 in housing 106 may be aligned with a single port of an audio component within housing 106. Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of device 100 of FIG. 1 is merely illustrative. In other implementations, device 100 may be a computer such as a computer that is integrated into a display such as a computer monitor, a laptop computer, a wearable device such as a smart watch, a pendant device, or other wearable or miniature device, a media player, a gaming device, a navigation device, a computer monitor, a television, a headphone, an earbud, or other electronic equipment.

In some implementations, device 100 may be provided in the form of a wearable device such as a smart watch. In one or more implementations, housing 106 may include one or more interfaces for mechanically coupling housing 106 to a strap or other structure for securing housing 106 to a wearer. Device 100 may include one, two, three, or more than three audio components each mounted adjacent to one or more of openings 108.

A speaker disposed within housing 106 transmits sound through at least one associated opening 108. A microphone may also be provided within housing 106 that receives sound through at least one associated opening in the housing 106. In one or more implementations, a speaker (e.g., speaker module) may be mounted such that an output port of the speaker is mounted adjacent to, and aligned with a corresponding opening 108. The speaker may include a front volume, a back volume, and one or more resonators including at least one vented resonator that allows airflow through the resonator between the front volume and the back volume, as described in further detail hereinafter.

Figure 2:
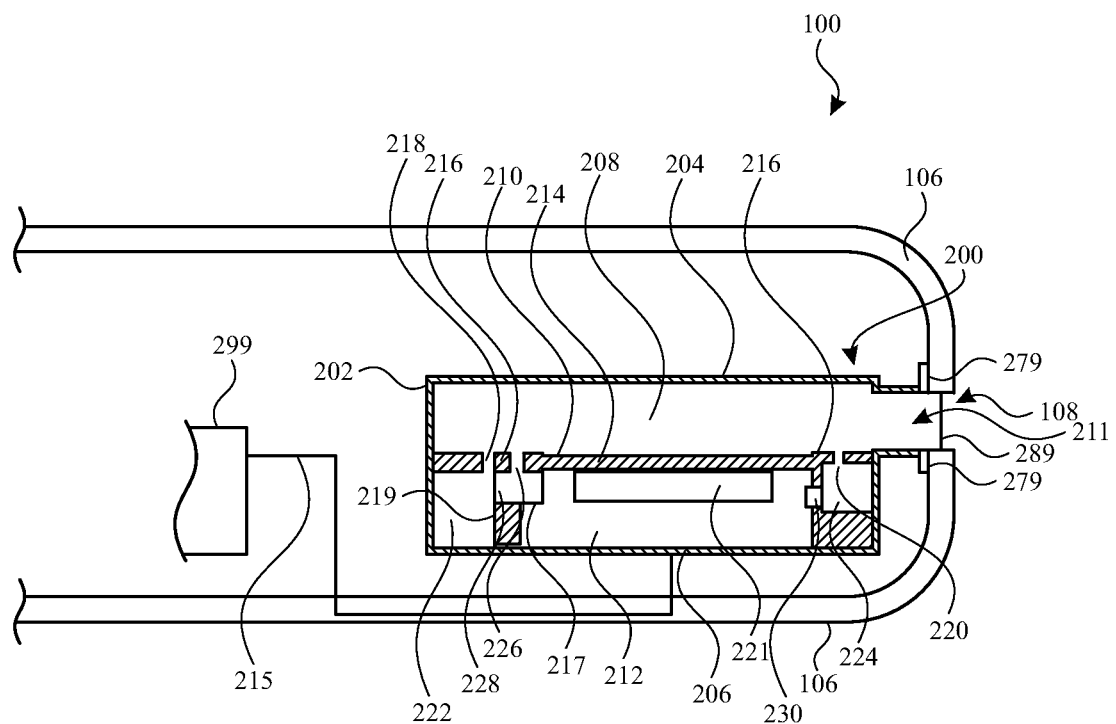
FIG. 2 illustrates a cross-sectional side view of a portion of an example electronic device having an audio transducer module with a vented resonator in accordance with various aspects of the subject technology.

FIG. 2 illustrates a cross-sectional view of a portion of device 100 in which an audio component is mounted. In the example of FIG. 2, device 100 includes speaker module 200 (also referred to herein as a speaker). Speaker module 200 includes housing 202 mounted adjacent at least one opening 108 in housing 106 of the device 100. Housing 202 (e.g., a speaker housing of the speaker module) may be formed form one or more materials such as plastic and/or metal. As shown, speaker module 200 may include a front volume 208 and a back volume 212 that are separated by a structure 210. The structure 210 may include a diaphragm 214 that is actuable to generate sound, and an interior wall 216, that a least partially separate the front volume 208 and the back volume 212.

As shown, speaker module 200 may include an output port 211 that is acoustically coupled to the front volume 208 and aligned with and mounted adjacent to an opening 108, so that sound generated by the diaphragm 214 (e.g., responsive to control signals received from control circuitry such as device circuitry 299) can be transmitted through the opening 108 to the external environment. For example, the output port 211 may be sealed to the opening 108 using a sealing material 279. Opening 108 may be an open port or may include a cover 289 such as a membrane or a mesh structure that discourages entry of liquid into housing 202, but that is permeable to sound and air. Circuitry 221 (e.g., including a voice coil for actuating the diaphragm 214 to generate sound) of the speaker module 200 may be coupled to device circuitry such as device circuitry 299 (e.g., one or more processors of the device) via a connector 215. Connector 215 may include a flexible integrated circuit or another flexible or rigid conductive connector.

As illustrated in FIG. 2, the front volume 208 may be bounded in part by a top wall 204 of housing 202 (e.g., a speaker housing) for the speaker module 200, and in part by the diaphragm 214 and the interior wall 216 that at least partially separate the front volume 208 from the back volume 212 within the housing. As shown, the back volume 212 may be bounded, in part by the interior wall 216 and a rear wall 206 of the housing 202.

As shown in FIG. 2, the speaker module 200 may include a first port 218 in the interior wall 216 and a second port 220 in the interior wall 216. A first resonator chamber 222 may be acoustically coupled to the front volume 208 (e.g., via the first port 218) and may be at least partially bounded by the rear wall 206 and a portion of a frame 219 of the speaker module 200. In one or more implementations, a portion of the frame 219 may form the interior wall 216. The speaker module 200 may also include second resonator chamber 224 that is acoustically coupled to the front volume 208 via a second port 220.

For simplicity, the first resonator chamber 222 and the second resonator chamber 224 are shown in FIG. 2 as being directly coupled to the front volume 208 by the respective first port 218 and second port 220. However, as described in further detail herein after, respective first and second channels (also referred to herein as necks) can be provided that extend between the front volume 208 and the respective first and second resonator chambers (e.g., via the first and second ports). In various implementations, the size (e.g., length, width, height, cross-sectional area, etc.) of the first and second channels can be arranged to provide desired frequency control for sound passing into and/or out of the respective first and second resonator chambers.

As shown in FIG. 2, the speaker module 200 may also include a third port 226 in the interior wall 216. A third resonant chamber 228 may be acoustically coupled to the front volume 208 by the third port 226 (e.g., and a corresponding channel or neck that extends between the third port 226 and the third resonant chamber 228). As shown, a structure 217 may acoustically and/or fluidly separate the third resonator chamber 228 from the back volume 212.

In one or more implementations, one or more of the resonator chambers of the speaker module 200 may include a barometric vent that allows passage of air between the resonator chamber and the back volume 212. For example, in FIG. 2, the second resonator chamber 224 is shown with a barometric vent 230 that allows passage of air between the second resonator chamber 224 and the back volume 212, and that prevents liquid from passing through the barometric vent 230. Because the second resonator chamber 224 is fluidly coupled to the front volume 208, the barometric vent 230 allows passage of air front the front volume 208 to the back volume 212 via the second resonator chamber 224. However, the arrangement of FIG. 2 is merely illustrative, and barometric vent 230 may be provided in any of the first resonator chamber 222, the second resonator chamber 224, or the third resonator chamber 228 and/or barometric vents may be provided in more than one of the first resonator chamber 222, the second resonator chamber 224, and the third resonator chamber 228.

In the example of FIG. 2, the third resonator chamber 228 is smaller than the first resonator chamber 222 and the second resonator chamber 224, and is disposed at least partially between the first resonator chamber 222 and the second resonator chamber 224.

Figure 3:
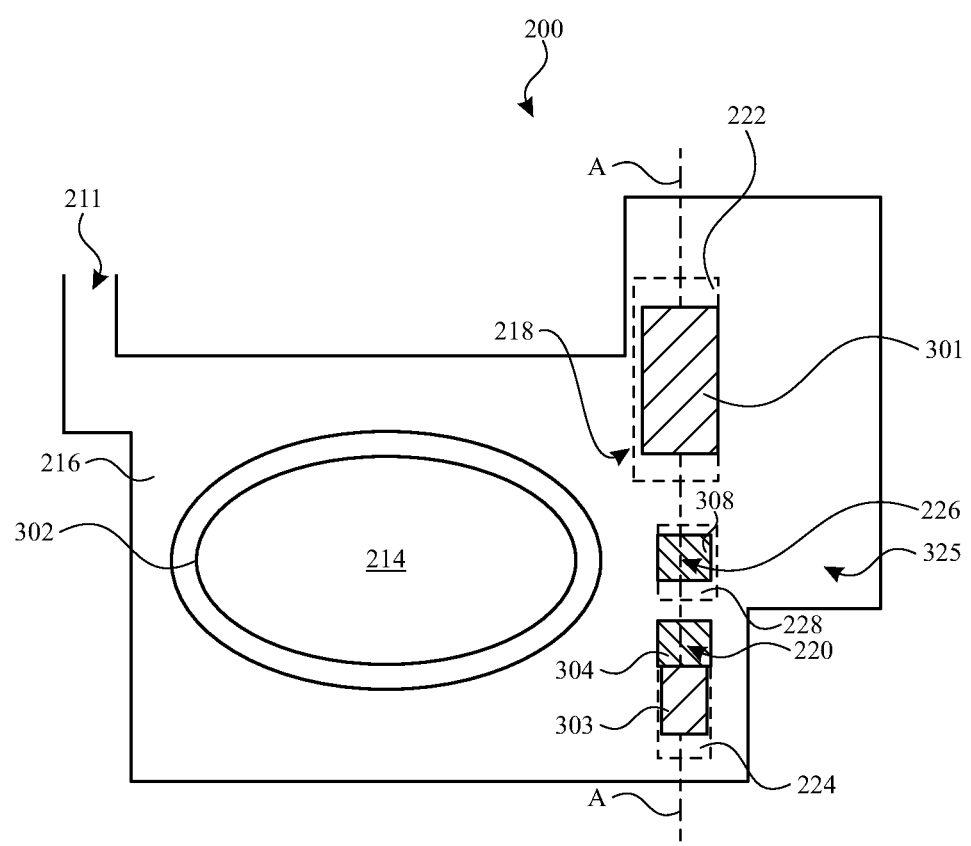
FIG. 3 illustrates a top view of an audio transducer module having multiple resonators including a vented resonator, with a top wall of a housing of the module removed in accordance with various aspects of the subject technology.

For example, FIG. 3 illustrates a top view of the speaker module 200 with the top wall 204 removed so that example locations for the first resonator chamber 222, the second resonator chamber 224, and the third resonator chamber 228 can be seen. In the example of FIG. 3, the top surface of the diaphragm 214 is visible, and the diaphragm 214 is and coupled to the interior wall 216 by a surround 302 that allows the diaphragm 214 to actuate to generate sound in the front volume 208 that passes out of the output port 211. As shown in FIG. 3, the first resonator chamber 222, the second resonator chamber 224, and the third resonator chamber 228 may be located away from the output port 211 for improved acoustic performance of the respective resonators formed by the first resonator chamber 222, the second resonator chamber 224, and the third resonator chamber 228. In the arrangement of FIG. 3, the third resonator chamber 228 is disposed between a drive region of the speaker module 200 in which the diaphragm 214 is located, and an additional speaker volume 325 (e.g., an excess volume that is fluidly coupled to the back volume 212).

FIG. 3 also illustrates how the first resonator chamber 222 and the second resonator chamber 224 may be covered by cover member 301 and cover member 303, respectively. The cover member 301 and the cover member 303 may partially define, respectively, the first resonator chamber 222 and the second resonator chamber 224 and/or first and second respective channels extending between the front volume 208 and the first resonator chamber 222 and the second resonator chamber 224.

As shown in FIG. 3, the speaker module 200 may include a first acoustic mesh 304 over the second port 220, and a second acoustic mesh 308 over the third port 226. As shown, the first acoustic mesh 304 may be spatially and acoustically separated from the second acoustic mesh 308. In this way, the mesh structure of the first acoustic mesh 304 and the second acoustic mesh 308 may be individually tuned to control (e.g., high frequency) sound input, respectively, to the first resonator chamber 222 and third resonator chamber 228.

Figure 4:
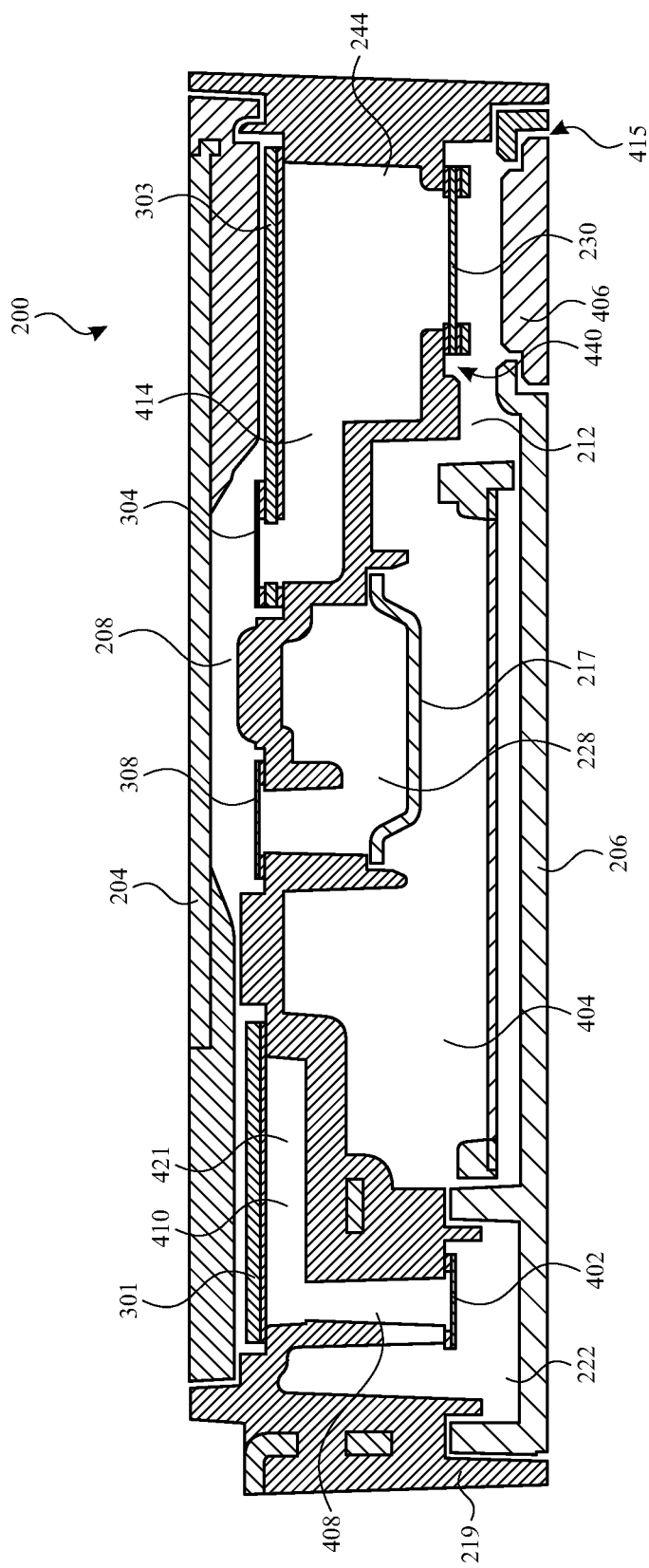
FIG. 4 illustrates a cross-sectional side view of an audio transducer module having a vented resonator in accordance with various aspects of the subject technology.

Additional features of the first and second resonators of the speaker module 200 can be seen in the cross-sectional side view of FIG. 4, taken along the line A-A of FIG. 3, in accordance with one or more implementations of the subject technology. As shown in FIG. 4, the speaker module may include a frame 219. A portion of the frame 219 may form, for example, the interior wall 216 of FIGS. 2 and 3.

As shown in FIG. 4, the first acoustic mesh 304 may span an opening in the frame 219 corresponding to the second port 220, and the second acoustic mesh 308 may span an opening in the frame 219 corresponding to the third port 226. FIG. 4 also shows how the speaker module 200 may include a first channel (e.g., channel 410) extending between the front volume 208 and the first resonator chamber 222, a second channel (e.g., channel 414) extending between the front volume 208 and the second resonator chamber 224 (e.g., via second port 220), and a third channel 423 extending between the front volume 208 and the third resonator chamber 228 (e.g., via third port 226). In this example, the second channel (e.g., channel 414) is partially defined (e.g., on a first side of the channel) by the cover member 303 and partially defined (e.g., on an opposing second side of the channel) by a portion of the frame 219. In this example, the first channel (e.g., channel 410) includes a horizontal portion 421 that is partially defined (e.g., on a first side of the channel) by the cover member 301 and partially defined (e.g., on an opposing second side of the channel) by a portion of the frame 219, and a vertical portion 408 that is defined by the frame 219 and extends substantially at a right angle from the horizontal portion 421 to the first resonator chamber 222. As shown, an acoustic mesh 402 may be provided at the interior end of the first channel (e.g., channel 410), spanning an opening from the vertical portion 408 to the first resonator chamber 222.

In the example of FIG. 4, the first resonator chamber 222 may a volume (a portion of which is not visible in the cross-section of FIG. 4) that is larger than the volume of the second resonator chamber 224, which is larger than the volume of the third resonator chamber 228. In the arrangement of the resonators shown in FIG. 3, the barometric vent 230 may be disposed in the second resonator chamber 224 due to, for example, (i) the lack of access between the first resonator chamber 222 and the back volume 212, the relatively larger size of the second resonator chamber 224 than the third resonator chamber 228 (e.g., thus providing additional space in which to mount the barometric vent structures), and/or (iii) the position of the third resonator chamber 228 in the airway 404 between the drive region of the speaker module 200 and the additional speaker volume 325. For example, in one more other implementations, a barometric vent can be provided in the structure 217 that bounds the third resonator chamber 228 and separates the third resonator chamber 228 from the back volume 212. However, in one more other implementations (e.g., including the implementation illustrated in FIG. 4), the barometric vent 230 may be formed in the second resonator chamber 224 to avoid adding additional structures that block or impede airflow through the airway 404 between the drive region of the speaker module 200 and the additional speaker volume 325.

As shown in FIG. 4, the speaker module 200 may also include a cap 406 that closes an opening 415 in the housing 202 of the speaker module 200. As shown, the cap 406 may be disposed adjacent to, and may have a size and a shape that corresponds to the size and shape of the barometric vent 230. Providing the cap 406 over the barometric vent 430 may allow testing of one or more seals of the front volume 208. For example, during manufacturing of the speaker module 200, the cap 406 may be removed and gas (e.g., air) can be injected into the front volume 208 via the barometric vent 230, the second resonator chamber 224, and the second port 220 to pressurize the front volume 208 for testing. During operation of the speaker module 200, the cap 406 may close and seal the opening 415, and airflow between the front volume 208 and the back volume 212 may occur via the second port 220, the second resonator chamber 224, and the barometric vent 230 (e.g., when the diaphragm 214 is actuated), which allows pressure equalization between the front volume 208 and the back volume 212.

As shown in the example of FIGS. 3 and 4, a speaker module, such as speaker module 200, may include a front volume 208, a back volume 212, a diaphragm 214 separating the front volume 208 from the back volume 212, a resonator having a second port 220 to the front volume 208 and a chamber (e.g., second resonator chamber 224) having at least one wall (e.g., wall 440) adjacent the back volume 212, and a vent (e.g., barometric vent 230) in the wall 440 that allows airflow from the front volume 208 to the back volume 212 via the resonator. As shown, the speaker module 200 may also include a channel 414 extending between the second port 220 and the chamber (e.g., second resonator chamber 224).

As shown, the vent allows the airflow from the front volume 208 to the back volume 212 via the second port 220, the channel 414, and the chamber (e.g., second resonator chamber 224). As shown, the chamber (e.g., second resonator chamber 224) may be disposed between the channel 414 and the vent (e.g., barometric vent 230).

In the example of FIG. 4, the speaker module 200 may also include a first additional resonator, the first additional resonator having a chamber (e.g., third resonator chamber 228) with a volume that is less than a volume of the chamber (e.g., second resonator chamber 224) of the resonator. The volume of the chamber (e.g., second resonator chamber 224) of the resonator may correspond to a first resonant frequency, and the volume of the chamber of the first additional resonator (e.g., third resonator chamber 228) may correspond to a second resonant frequency that is higher than the first resonant frequency. In one or more implementations, the speaker module 200 may also include a second additional resonator having a chamber (e.g., first resonator chamber 222) with a volume that corresponds to a third resonant frequency that is lower than the first and second resonant frequencies. As shown in FIGS. 3 and 4, the first additional resonator may be disposed at least partially between the resonator and the second additional resonator. In one or more implementations, the second additional resonator (e.g., including the first resonator chamber 222) may bounded at least in part by a portion of a rear wall 206 of a housing 202 of the speaker module 200. As shown in FIG. 4, in one more implementations, the second additional resonator may include a channel 410 that extends between the front volume 208 and the chamber (e.g., first resonator chamber 222) of the second additional resonator, the channel 410 having a horizontal portion 421 that is at least partially defined by a cover member 301 that separates the channel 410 from the front volume 208, and a vertical portion 408 that extends substantially orthogonally to the horizontal portion. The second additional resonator may also include an acoustic mesh 402 that spans an internal end of the vertical portion 408 of the channel 410 within the chamber (e.g., first resonator chamber 222).

Figure 5:
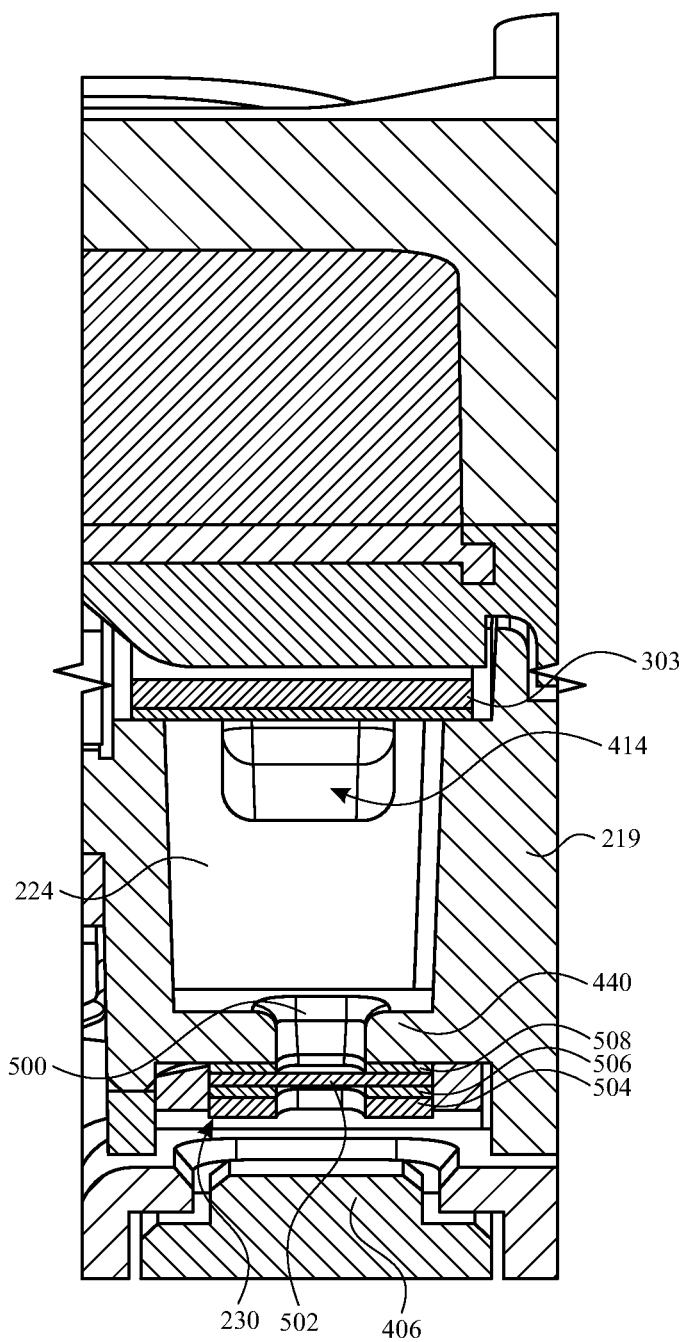
FIG. 5 illustrates a top perspective cross-sectional view of a portion of the audio transducer module of FIG. 4 in accordance with various aspects of the subject technology.

FIG. 5 illustrates an enlarged top perspective cross-sectional view of a portion of the speaker module 200 of FIG. 4, in order to illustrate features of the vented resonator of the speaker module. As shown in FIG. 5, the barometric vent 230 may be formed, in part, by an opening 500 in the wall 440 that separates the second resonator chamber 224 from the back volume 212. As shown, the barometric vent 230 may include a membrane 502 that spans the opening 500 in the wall 440. The membrane 502 may be an air-permeable, liquid-resistant membrane (e.g., a polytetrafluoroethylene (PTFE) membrane, such as an extended PTFE or ePTFE membrane) that allows air to pass through the membrane and that prevents liquid (e.g., water) from passing through the membrane. In this way, the barometric vent 230 allows pressure equalization between the front volume 208 and the back volume 212, and prevents liquid ingress into the back volume from the front volume (e.g., in a scenario in which water or other liquid enters the speaker module 200 from the external environment through the opening 108 and the output port 211).

As shown in FIGS. 4 and 5, the barometric vent 230 may be disposed within the back volume 212 (e.g., and mounted to a surface of the wall 440 that interfaces with the back volume). As shown, the barometric vent 230 may include an adhesive layer 508 (e.g., a pressure-sensitive adhesive or other adhesive) that attaches a first side of the membrane 502 to the wall 440 and has an opening that is aligned with the opening 500. The barometric vent 230 may also include an adhesive layer 506 (e.g., a pressure-sensitive adhesive or other adhesive) on an opposing second side of the membrane 502, the adhesive layer 506 also including an opening aligned with the opening in the adhesive layer 508 and the opening 500 in the wall 440. The barometric vent may also include a stiffener layer 504 that has an opening aligned with the opening in the adhesive layer 508, the opening in the adhesive layer 506, and the opening 500 in the wall 440, and that is attached to the second side of the membrane by the adhesive layer 506.

It is also appreciated that the structure of the barometric vent 230 and the location of the barometric vent 230 can be varied while still allowing airflow and preventing liquid ingress through the opening 500. For example, in various other implementations, the ends of the membrane 502 may be embedded within the wall 440 or within a mounting ring that is attached to the interior edge of the opening 500. As another example, the membrane 502 may be attached to the wall 440 on the side of the wall 440 that is interior to the second resonator chamber 224. The arrangement shown in FIG. 5 may be advantageous as the barometric vent 230 can be implemented in the speaker module by inserting the barometric vent 230 into the speaker module through the opening 415 (e.g., and attaching the membrane 502 to the wall 440 using the adhesive layer 508 while the cap 406 is removed), and then closing the opening 415 with the cover structure.

As illustrated by the examples of FIGS. 2-5, a speaker module 200 may be provided that includes a front volume 208, a back volume 212, and a vented resonator having a port (e.g., second port 220) to the front volume 208, a resonator chamber (e.g., second resonator chamber 224), a channel 414 extending from the port to the resonator chamber, and a barometric vent 230 between the resonator chamber and the back volume 212. In one or more implementations, the vented resonator is formed, in part, by an opening 500 in a wall 440 that defines at least a portion of the resonator chamber, and a membrane 502 that extends over the opening 500. In one or more implementations, the membrane 502 is disposed within the back volume 212 and is attached to a surface of the wall 440 that interfaces with the back volume 212. In one or more implementations, the speaker module also includes at least one additional resonator (e.g., including the first resonator chamber 222 and/or including the third resonator chamber 228) that is fluidly coupled to the front volume 208 and that is fluidly separate from back volume 212.

Figure 6:
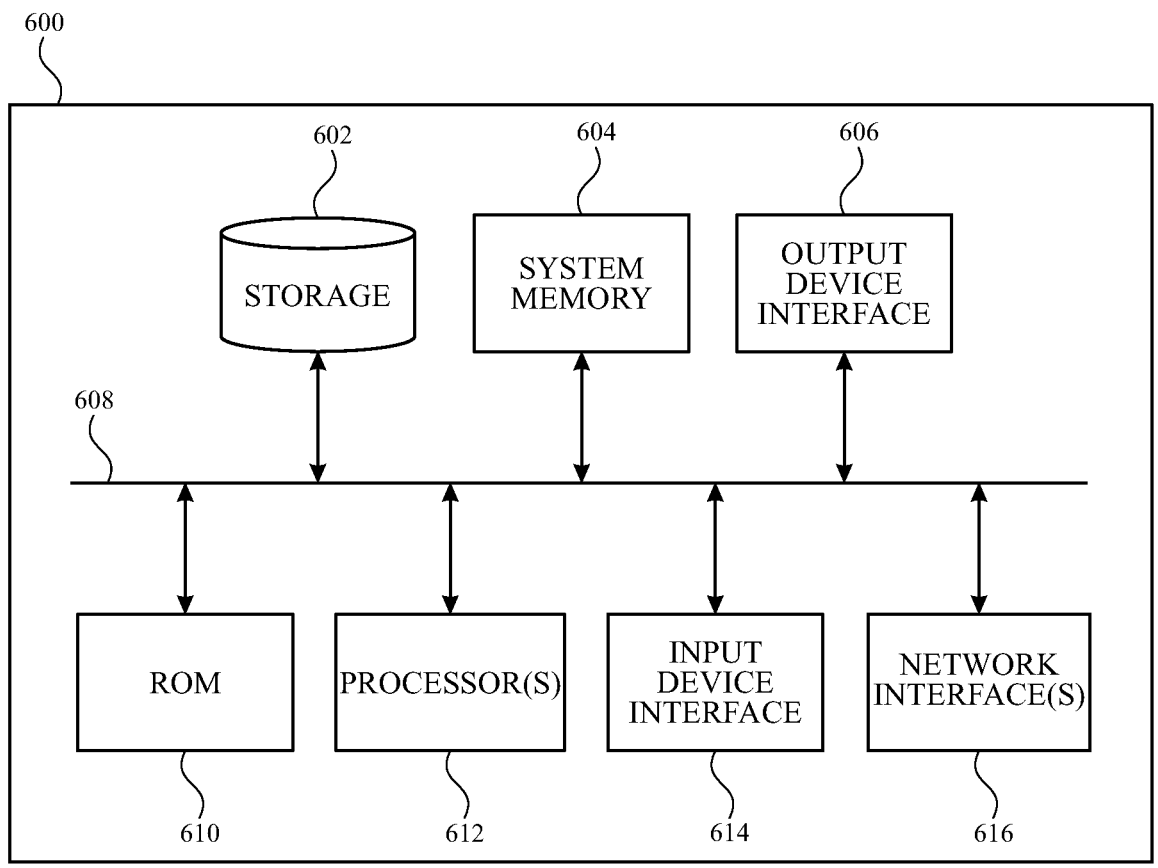
FIG. 6 illustrates an electronic system with which one or more implementations of the subject technology may be implemented.

FIG. 6 illustrates an electronic system 600 with which one or more implementations of the subject technology may be implemented. The electronic system 600 can be, and/or can be a part of, one or more of the device 100 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, a speaker or speaker module, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

In accordance with some aspects of the subject disclosure, a speaker is provided that includes a front volume, a back volume, a diaphragm separating the front volume from the back volume, a resonator having a port to the front volume and a chamber having at least one wall adjacent the back volume, and a vent in the wall that allows airflow from the front volume to the back volume via the resonator.

In accordance with other aspects of the subject disclosure, an electronic device is provided that includes a device housing having an opening, and a speaker having an output port aligned with the opening in the device housing. The speaker includes a front volume, a back volume, a diaphragm separating the front volume from the back volume, a resonator having a port to the front volume and a chamber having at least one wall adjacent the back volume, and a vent in the wall that allows airflow from the front volume to the back volume via the resonator.

In accordance with other aspects of the subject disclosure, a speaker is provided that includes a front volume, a back volume, and a vented resonator having a port to the front volume, a resonator chamber, a channel extending from the port to the resonator chamber, and a barometric vent between the resonator chamber and the back volume.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM.

The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A speaker, comprising:
   a front volume;
   a back volume;
   a diaphragm separating the front volume from the back volume;
   a resonator having a port to the front volume and a chamber having at least one wall adjacent the back volume; and
   a vent in the wall that allows airflow from the front volume to the back volume via the resonator.

2. The speaker of claim 1, further comprising a channel extending between the port and the chamber.

3. The speaker of claim 2, wherein the vent allows the airflow from the front volume to the back volume via the port, the channel, and the chamber.

4. The speaker of claim 3, wherein the chamber is disposed between the channel and the vent.

5. The speaker of claim 1, further comprising a first additional resonator, the first additional resonator having a chamber with a volume that is less than a volume of the chamber of the resonator.

6. The speaker of claim 5, wherein the volume of the chamber of the resonator corresponds to a first resonant frequency, and the volume of the chamber of the first additional resonator corresponds to a second resonant frequency that is higher than the first resonant frequency.

7. The speaker of claim 6, further comprising a second additional resonator having a chamber with a volume that corresponds to a third resonant frequency that is lower than the first resonant frequency and the second resonant frequency.

8. The speaker of claim 7, wherein the first additional resonator is disposed at least partially between the resonator and the second additional resonator.

9. The speaker of claim 8, wherein the second additional resonator is bounded at least in part by a portion of a rear wall of a housing of the speaker.

10. The speaker of claim 9, wherein the second additional resonator includes:
    a channel that extends between the front volume and the chamber of the second additional resonator, the channel having a horizontal portion that is at least partially defined by a cover member that separates the channel from the front volume, and a vertical portion that extends substantially orthogonally to the horizontal portion; and
    an acoustic mesh that spans an internal end of the vertical portion of the channel within the chamber.

11. The speaker of claim 1, wherein the vent comprises:
    an opening in the wall; and
    a membrane that spans the opening in the wall, wherein the membrane is an air-permeable liquid-resistant membrane.

12. An electronic device, comprising:
    a device housing having an opening; and
    a speaker having an output port aligned with the opening in the device housing, the speaker, comprising:
      a front volume;
      a back volume;
      a diaphragm separating the front volume from the back volume;
      a resonator having a port to the front volume and a chamber having at least one wall adjacent the back volume; and
      a vent in the wall that allows airflow from the front volume to the back volume via the resonator.

13. The electronic device of claim 12, further comprising an additional resonator that includes:
    a channel that extends between the front volume and the chamber of the additional resonator, the channel having a horizontal portion that is at least partially defined by a cover member that separates the channel from the front volume, and a vertical portion that extends substantially orthogonally to the horizontal portion; and
    an acoustic mesh that spans an internal end of the vertical portion of the channel within the chamber.

14. The electronic device of claim 12, the speaker further comprising a channel extending between the port and the chamber, wherein the chamber is disposed between the channel and the vent.

15. The electronic device of claim 14, wherein the vent allows the airflow from the front volume to the back volume via the port, the channel, and the chamber.

16. The electronic device of claim 12, wherein the vent comprises:
    an opening in the wall; and
    a membrane that spans the opening in the wall, wherein the membrane is an air-permeable liquid-resistant membrane.

17. A speaker, comprising:
    a front volume;

a back volume; and a vented resonator having a port to the front volume, a resonator chamber, a channel extending from the port to the resonator chamber, and a barometric vent between the resonator chamber and the back volume.

18. The speaker of claim 17, wherein the vented resonator is formed, in part, by an opening in a wall that defines at least a portion of the resonator chamber, and a membrane that extends over the opening.

19. The speaker of claim 18, wherein the membrane is disposed within the back volume and is attached to a surface of the wall that interfaces with the back volume.

20. The speaker of claim 17, further comprising at least one additional resonator that is fluidly coupled to the front volume and that is fluidly separate from back volume.

* * * * *